Oct. 19, 1948.  C. H. JOLLY  2,451,745
ROCKET LAUNCHING DEVICE
Filed June 13, 1945
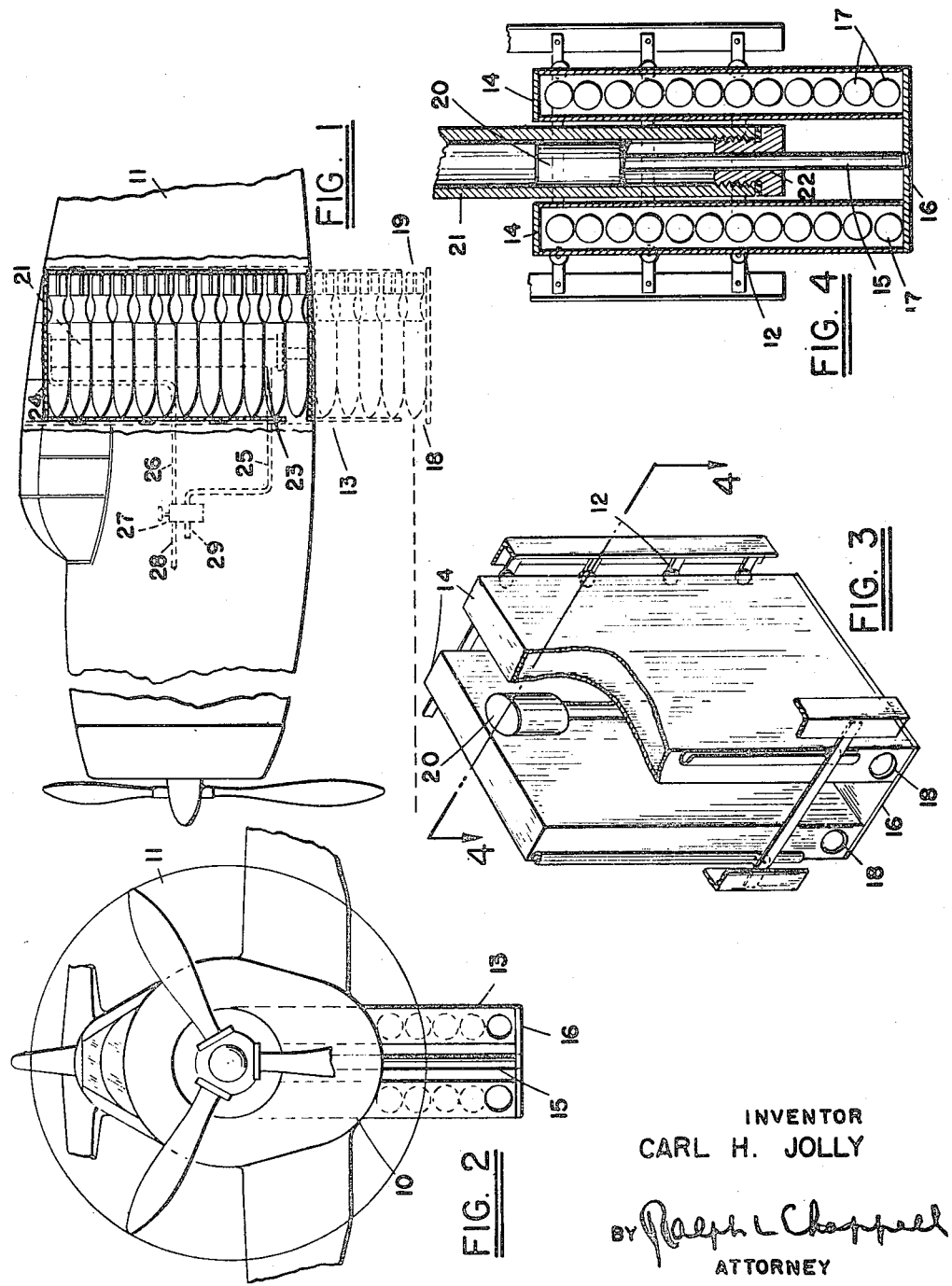
INVENTOR
CARL H. JOLLY
ATTORNEY

ID OFFICE

UNITED STATES PATENT OFFICE 2,451,745

ROCKET LAUNCHING DEVICE

Carl H. Jolly, United States Navy

Application June 13, 1945, Serial No. 599,294

1 Claim. (Cl. 89—1.7)

(Granted under the act of March 3, 1883, as amended April 30, 1928; 370 O. G. 757)

This invention relates to rocket launching devices for airplanes, and is directed particularly to those of the retractable type.

The chief object of the present invention is to provide a rocket carrying airplane with a retractable carriage which is housed within the body of the airplane during flight so that its streamlined effect is not disturbed, and which may be extended beyond the body of the airplane to place the rockets in position for firing in a line of travel parallel to the airplane thrust line beyond the propeller arch.

A further object is to provide a rocket launching device which permits an airplane such as of the F6F type to carry a greater load of rockets.

Other features of the present invention will be apparent from the following detailed description of the specific embodiment thereof.

Preferred embodiments of the present invention will be hereinafter described with reference to the accompanying drawings wherein like numerals refer to like parts and in which:

Fig. 1 is a view in side elevation of the airplane showing the retractable rocket carrying device with the rockets in position;

Fig. 2 is a front view with the device in its extended position;

Fig. 3 is a detail view of the carriage and the piston; and

Fig. 4 is a section taken along line 4—4 of Fig. 3.

Referring to the accompanying drawings, the numeral 10 refers to a bomb bay opened at its bottom portion in the airplane 11. Along the forward and aft walls of the bay 10 there are a plurality of spaced rollers 12 along which the combination elevator and bomb rack 13 slides. The bomb rack 13 consists of rectangularly spaced box-like containers 14 separated by a piston rod 15 with all three parts being rigidly mounted on a common base plate 16. Each of the rocket containers 14 are of sufficient width and length to receive a single row of rockets 17 mounted one upon the other. On the forward and aft walls of each of the containers 14 and at the lowermost portion thereof immediately adjacent to the base plate 16, are openings 18, 18 and 19, 19. The openings 18, 18 are of sufficient size to permit the rockets 17 adjacent to the opening to leave the carriage 13 when set off by customary rocket firing mechanism (not shown). The openings 19, 19 permit the escape of the burning gases generated by the rocket.

At the topmost portion of the piston rod 15 there is mounted thereon, a piston 20 which is slidably positioned in a cylinder 21 having an opening 22 in its bottom wall and ports 23 and 24 along the side wall at each end of the cylinder. The ports 23 and 24 which are connected to conduits 25 and 26, respectively, extend to a customary dual passageway reversing valve 27 which is in turn connected to a conduit 28 extending to a source of fluid under pressure (not shown), and a discharge conduit 29. The reversing valve 27 which is well known in the art, permits the source of fluid in the conduit 28 to flow through the conduit 26 and the opening 24, while the conduit 25 is in communication with the discharge line 29. In a second position of the valve 27 the source of fluid under pressure will flow through the conduit 25 and into the opening 23 with the conduit 26 in communication with the discharge line 29. As can be readily seen, when the valve 27 is in the first of the above-mentioned positions, the piston 20 is forced downwardly carrying along with it the rocket carriage, 14, 14, to its extended position, while the valve in its second position will cause the piston 20 to move upwardly to place the rocket carriage 14 in its retracted or elevated position. The piston rod 15 is of such length that with the device in its extreme positions, the openings 18, 18 through which the lowermost rockets are fired are positioned beyond the propeller arch and when the device is elevated, the base plate 16 is flush with the surface of the airplane so that its streamlined effect is not disturbed.

Although the present invention utilizes hydraulic means for lowering and elevating the rocket bomb rack, either hand or electrically operated means may be used.

While the form of mechanism herein shown and described constitutes a preferred form of embodiment of the present invention, it is understood that other forms might be adopted, all coming within the scope of the claim which follows.

The invention described herein may be manufactured and used by or for the Government of the United States of America for governmental purposes without the payment of any royalties thereon or therefor.

What I claim is:

A missile launching device for airplanes comprising an open bay in an airplane, a vertically movable rack in said bay, said rack comprising a plurality of containers spaced from each other, each container being rectangular in cross-section and rigidly mounted on a common base plate, a plurality of missiles vertically positioned in each of said containers, an opening in each of the forward and aft walls of said containers adjacent said base plate, a piston rod rigidly mounted on said base plate of such length to house said rack within the airplane in one position and to place said openings in said rack beyond the propeller arch in line of travel parallel to the airplane thrust line in a second position, a cylinder in axial alignment with said piston rod, a piston fixed to the free end of said piston rod and slidably mounted in said cylinder, an opening in each end of said cylinder, conduit means for placing one of said openings in communication with a source of fluid under pressure and the other of said openings in a discharge outlet, and reversing valve means operably connected to said conduit means for reversing the flow of fluid through said openings.

CARL H. JOLLY.

REFERENCES CITED

The following references are of record in the file of this patent:

UNITED STATES PATENTS

| Number | Name | Date |
|---|---|---|
| 1,636,451 | Andrus | July 19, 1927 |
| 1,890,142 | Bollam | Dec. 6, 1932 |
| 2,019,652 | Brookley | Nov. 5, 1935 |
| 2,193,139 | Monteith et al. | Mar. 12, 1940 |